US012215678B2

(12) United States Patent
Gonzalez et al.

(10) Patent No.: US 12,215,678 B2
(45) Date of Patent: Feb. 4, 2025

(54) FLUSHING CIRCUIT FOR A HYDRAULIC MACHINE

(71) Applicant: Poclain Hydraulics Industrie, Verberie (FR)

(72) Inventors: Sebastien Gonzalez, Picardie (FR); Julien Engrand, Verberie (FR); Loic Bonnard, Verberie (FR)

(73) Assignee: Poclain Hydraulics Industrie (FR)

( * ) Notice: Subject to any disclaimer, the term of this patent is extended or adjusted under 35 U.S.C. 154(b) by 0 days.

(21) Appl. No.: 18/560,777

(22) PCT Filed: May 9, 2022

(86) PCT No.: PCT/FR2022/050885
§ 371 (c)(1),
(2) Date: Nov. 14, 2023

(87) PCT Pub. No.: WO2022/214772
PCT Pub. Date: Oct. 13, 2022

(65) Prior Publication Data

US 2024/0247635 A1 Jul. 25, 2024

(30) Foreign Application Priority Data

May 19, 2021 (FR) ....................................... 2105228

(51) Int. Cl.

| | |
|---|---|
| ***F04B 1/047*** | (2020.01) |
| ***F03C 1/04*** | (2006.01) |
| ***F03C 1/047*** | (2006.01) |
| ***F04B 1/0443*** | (2020.01) |
| ***F04B 53/08*** | (2006.01) |

(52) U.S. Cl.
CPC ............ *F04B 1/047* (2013.01); *F03C 1/0431* (2013.01); *F03C 1/047* (2013.01); *F04B 1/0443* (2013.01); *F04B 53/08* (2013.01)

(58) Field of Classification Search
CPC ...... F04B 1/047; F04B 1/0443; F03C 1/0431; F03C 1/047
See application file for complete search history.

(56) References Cited

U.S. PATENT DOCUMENTS

| | | | | |
|---|---|---|---|---|
| 6,585,088 B1 * | 7/2003 | Fontaine | ............... | F16D 65/186 188/170 |
| 2016/0348674 A1 * | 12/2016 | Vidal | ..................... | F16J 15/004 |
| 2018/0017117 A1 * | 1/2018 | Engrand | ............... | F16D 65/853 |
| 2019/0128259 A1 * | 5/2019 | Gerlach | ................ | F03C 1/0431 |

FOREIGN PATENT DOCUMENTS

| | | |
|---|---|---|
| EP | 3480458 A1 | 10/2018 |
| FR | 3014940 A1 | 6/2015 |
| FR | 3037354 A1 | 12/2016 |
| WO | WO 2007048979 A1 | 5/2007 |

* cited by examiner

*Primary Examiner* — Thomas E Lazo
(74) *Attorney, Agent, or Firm* — Lippes Mathias LLP

(57) ABSTRACT

A hydraulic machine including an improved sweep circuit, adapted to form a primary sweep stream circulating from an inlet orifice successfully in a proximal portion, in a middle portion and in a distal portion of the hydraulic machine, then in the middle portion and in the proximal portion up to an outlet orifice.

10 Claims, 5 Drawing Sheets

FLUSHING CIRCUIT FOR A HYDRAULIC MACHINE

BACKGROUND OF THE DISCLOSURE

The present disclosure relates to a hydraulic machine comprising an improved sweep system.

STATE OF THE ART

FIG. 1 schematically represents an example of a hydraulic machine structure, for example a hydraulic pump or a hydraulic motor.

The hydraulic machine 100 as schematized has a shaft 102 extending along a main axis X-X. Schematically, several portions can be defined for the hydraulic machine 100: a proximal portion 110, a middle portion 120 and a distal portion 130, the designations proximal and distal being defined arbitrarily with respect to the main axis X-X, and being used in the text to locate the position of different elements.

The proximal portion 110 has a distribution supply function. It comprises a distributor 112, and more generally the means ensuring a supply and a discharge of fluid, typically two ducts defining a duct qualified as high-pressure (HP) duct and a duct qualified as low-pressure (LP) duct.

The middle portion 120 defines the hydro-torque of the hydraulic machine 100. It comprises a cylinder block 122 comprising a plurality of housings in which pistons 124 are slidably mounted, said pistons 124 coming into contact with a multi-lobe cam 126.

The distal portion 130 typically comprises the bearing of the hydraulic machine 100. In the example represented, the distal portion comprises two tapered roller bearings 132 forming a rolling bearing ensuring the relative rotational movement of the hydraulic machine. The distal portion 130 can also comprise other elements, for example a braking device.

FIG. 1 schematically represents an example of a closed-loop circuit of the hydraulic machine 100, comprising a hydraulic pump 10 coupled to a primary motor M which ensures the rotational driving. The hydraulic pump 10 has two orifices defining an intake and a discharge, which are connected respectively to a discharge and to an intake formed in the proximal portion 110 of the hydraulic machine 100, so as to form a closed hydraulic circuit having two branches arbitrarily referred to as high-pressure HP branch and low-pressure LP branch.

Thus in the hydraulic machine 100, the closed-loop circuit corresponds to the circuit in which the working fluid of the hydraulic machine 100 circulates, typically oil, linked to the rotational movement of the hydraulic machine 100. The closed-loop circuit also comprises a booster pump 12, which can be coupled to this same primary motor M or driven by another element. The booster pump 12 is connected to the ducts of the hydraulic circuit via check valves 14 so as to ensure a boosting the hydraulic circuit.

In such a hydraulic machine 100, the closed-loop circuit of the hydraulic machine 100 is distinguished with respect to its internal volume. FIG. 1 schematizes the closed-loop circuit by dotted lines, and the internal volume by hatching.

The internal volume of the hydraulic machine 100 is here defined as being the space inside the hydraulic machine which is not part of the closed loop, and which is typically at an internal pressure very much lower than the pressure of the working fluid of the hydraulic machine, for example at a pressure close to atmospheric or ambient pressure. The closed-loop circuit is typically sealed and isolated from the internal volume by means of suitable sealing elements.

The working fluid circulating in the closed-loop circuit and which travels through the different components of a hydraulic circuit such as pumps, motors, ducts and various regulation components tends to heat up, in particular due to friction between the different inner elements of the hydraulic machine 100 and to the pressure drops.

To cool the fluid circulating in the closed-loop circuit, it is known to provide for an exchange function; oil which is qualified as “hot” is taken from the closed loop on the line of lowest pressure thanks to an exchange valve 16 to replace it with the same volume of oil that comes from a tank R thanks to the booster pump 12 and to the circuit elements associated with the boosting, this oil being at a lower temperature and having been typically filtered. Such a function thus makes it possible to lower the temperature of the oil circulating in the closed loop.

However, as indicated above, the internal volume of the hydraulic machine 100 is dissociated from the closed loop in a sealed manner, as a result, the exchange does not cool the oil contained in the internal volume of the hydraulic machine 100.

To cool the internal volume, it is therefore known to carry out a sweep of the internal volume of the hydraulic machine 100 by means of a fluid which is introduced into the internal volume (for example taken from a low-pressure branch of the hydraulic circuit thanks to the exchange valve or directly coming from the booster pump) then to make this same amount of fluid exit through a drain.

However, the solutions currently proposed do not allow carrying out a sweep of the entire internal volume, or require defining dedicated sweep streams having intake and discharge ducts distributed in the different portions of the hydraulic machine 100, for example in the proximal portion 110 and the distal portion 130 which is restrictive in terms of implantation and maintenance. The addition of additional ducts indeed poses additional problems in terms of access and increases the risk of tearing of the ducts.

Another known solution consists in using the leaks from the closed loop towards the internal volume of the hydraulic machine 100 in association with a drain added to the casing of the hydraulic machine 100 to carry out a sweep of the internal volume. Nevertheless, it turns out that such a solution leads to insufficient sweep that does not allow cooling the entire internal volume and in particular the parts farthest from the areas in which the leaks occur and from the drain.

Whatever the structure proposed, when the internal volume of the motor is not sufficiently swept, the oil present in the internal volume can heat up, in particular due to the friction of the different movable parts or pressure drops, and become hotter than the exchanged oil, particularly in areas of the internal volume remote from the inlet or the outlet of the sweep fluid.

The present disclosure aims to respond at least partially to these problems.

SUMMARY OF THE DISCLOSURE

In order to respond at least partially to these problems, the present invention relates to an assembly comprising a hydraulic machine comprising a first assembly and a second assembly that are movable in rotation relative to each other along a main axis, the first assembly comprising a shaft (102) and the second assembly comprising a casing, said hydraulic machine having three portions extending successively from a proximal end to a distal end along the main axis, a proximal portion, comprising a distributor and fluid supply and discharge ducts, a middle portion, comprising a cylinder block and a cam, a distal portion, comprising bearings, said hydraulic machine having an internal volume and comprising a circuit for sweeping the internal volume, said sweep circuit having a fluid inlet orifice in the proximal portion, a fluid outlet orifice (220) in the proximal portion, said sweep circuit being configured so as to form a primary sweep stream circulating from the inlet orifice successively in the proximal portion, in the middle portion and in the distal portion of the hydraulic machine, then in the middle portion and in the proximal portion up to the outlet orifice.

According to an example, the sweep circuit defines two streams in the internal volume of the hydraulic machine:

the primary stream, and a secondary stream, the primary stream and the secondary stream being injected into the hydraulic machine through the fluid inlet orifice, and exiting the hydraulic machine through the fluid outlet orifice.

According to an example, the secondary stream defines a circulation of fluid within the proximal portion, between the fluid inlet orifice and the fluid outlet orifice.

According to an example, the primary stream and the secondary stream are calibrated by means of restrictions defining the maximum fluid flow rate for each of said streams.

According to an example, the distal portion of the hydraulic machine comprises a braking device.

According to an example, said assembly comprises an exchange valve, adapted to take hydraulic fluid from the duct having the lowest pressure among the intake duct and the discharge duct of the hydraulic machine; and inject it into the fluid inlet orifice of the sweep circuit.

According to an example, said exchange valve is integrated into a distribution cover of the hydraulic machine.

According to an example, said assembly comprises a sweep valve, adapted to take hydraulic fluid from a booster circuit associated with the hydraulic machine or from a control circuit associated with the hydraulic machine.

According to an example, the sweep circuit comprises ducts formed in the distributor and/or the shaft and/or the cylinder block of the hydraulic machine, so as to convey the sweep fluid from the inlet orifice to the distal portion of the hydraulic machine, and inject the sweep fluid into an internal volume of the distal portion of the hydraulic machine.

The distal portion then typically comprises a sleeve positioned around the shaft, bearing against the cylinder block, said bearing of the sleeve against the cylinder block being provided with a sealing element, said sleeve being configured so as to define a fluid passage along the shaft, up to a distal end of the internal volume of the distal portion of the hydraulic machine.

BRIEF DESCRIPTION OF THE DRAWINGS

The invention and its advantages will be better understood upon reading the detailed description given below of different embodiments of the invention given by way of non-limiting examples.

In all of the figures, common elements are identified by identical numerical references.

DETAILED DESCRIPTION OF THE PREFERRED EMBODIMENTS

Figure 1:
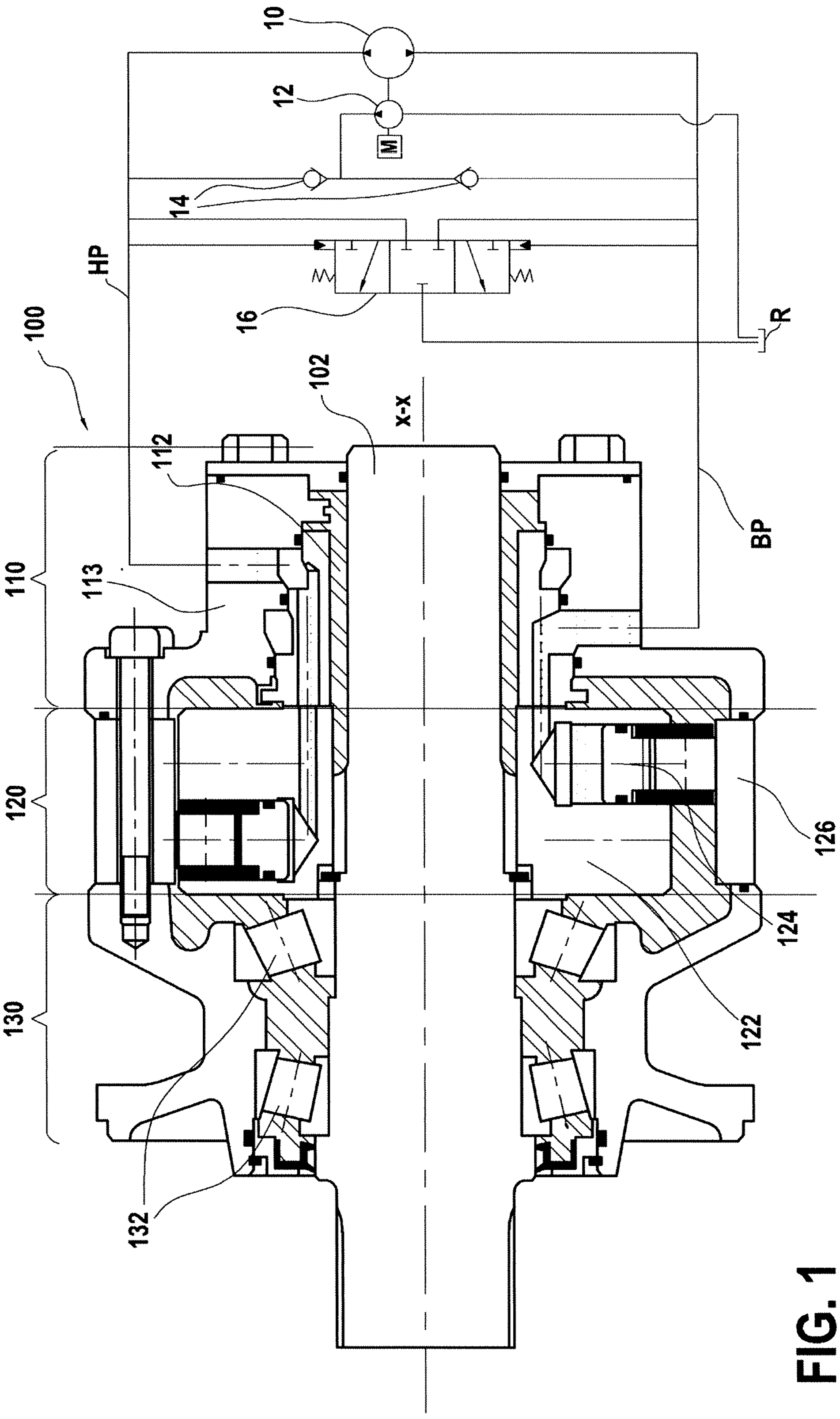
FIG. 1 is a schematic diagram of an existing hydraulic machine.
Figure 2:
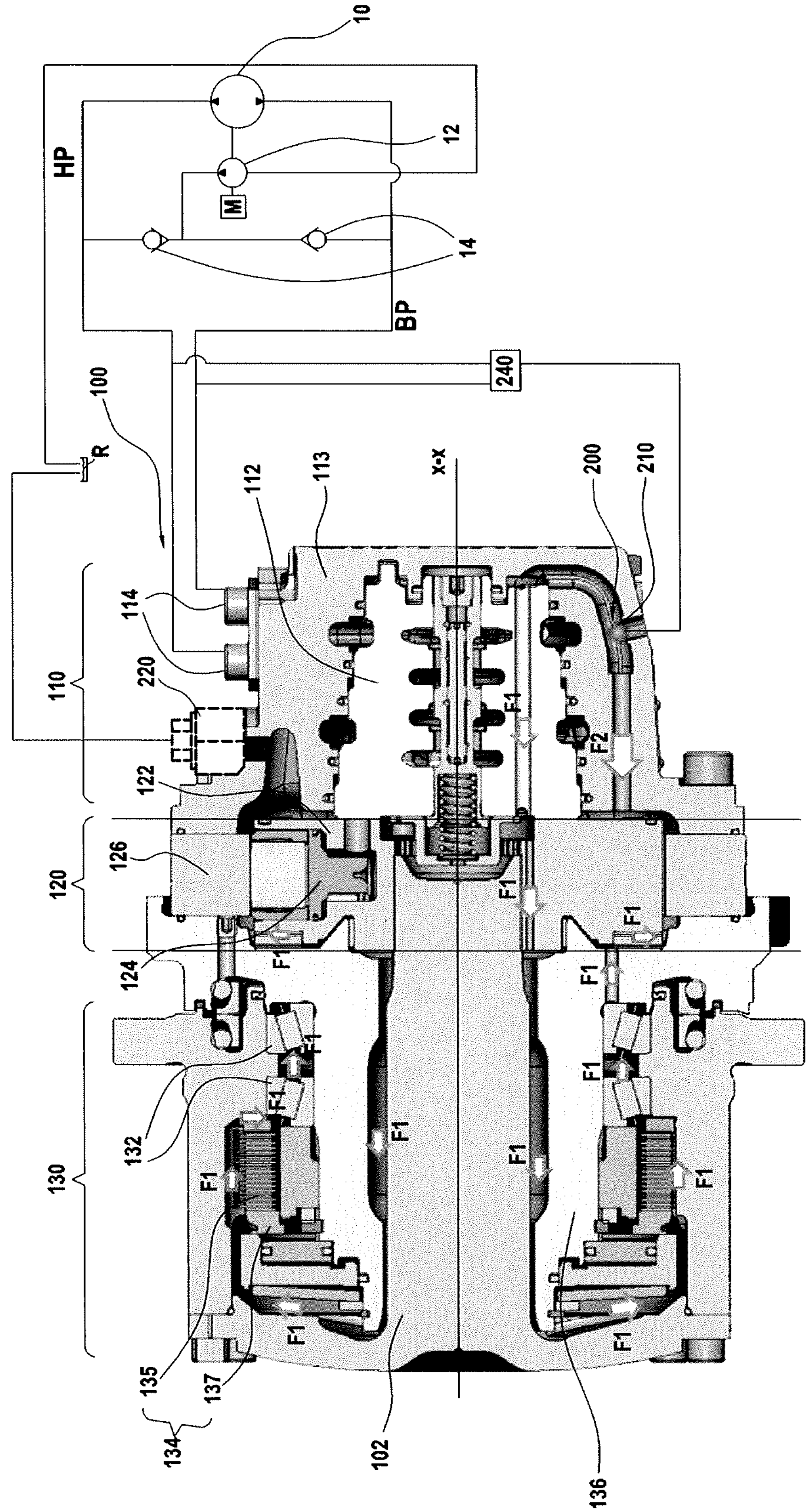
FIG. 2 is a schematic view of a hydraulic machine in accordance with one aspect of the disclosure.

FIG. 2 shows an example of a hydraulic machine according to one aspect of the invention. There are in this figure the different elements already described with reference to FIG. 1. The hydraulic machine 100 as schematized thus has a shaft 102 extending along a main axis X-X. Schematically, several portions can be defined for the hydraulic machine 100: a proximal portion 110, a middle portion 120 and a distal portion 130, the designations proximal and distal being defined arbitrarily with respect to the main axis X-X.

The proximal portion 110 has a distribution supply function. It comprises a distributor 112 surrounded by a distribution cover 113, and more generally the means ensuring a fluid supply and discharge, typically two ducts 114 defining a duct qualified as high-pressure duct and a duct qualified as low-pressure duct, which are here formed in the distribution cover 113.

The middle portion 120 defines a portion generally qualified as being the hydro-torque of the hydraulic machine 100. It comprises a cylinder block 122 comprising a plurality of housings in which pistons 124 are slidably mounted, said pistons 124 coming into contact with a multilobe cam 126.

The distal portion 130 typically comprises the bearing of the hydraulic machine 100. In the example represented, the distal portion comprises two tapered roller bearings 132 forming a rolling bearing ensuring the relative rotational movement of the hydraulic machine 100, as well as a braking device 134 adapted to selectively apply a friction force opposing to the rotational movement of the hydraulic machine 100, and dynamic seals. The braking device 134 as represented comprises stacks of disks 135 and an actuator 137, adapted to selectively engage or disengage said stacks of disks 135 and thus apply or not a resistive force opposing the rotational movement of the hydraulic machine 100.

As indicated in the preamble, considering that the hydraulic connectors are located in the proximal portion 110, a problem concerns the fluid sweep of the internal volume of the middle portion 120 and of the distal portion 130. By internal volume of the hydraulic machine 100, it is meant a volume internal to the casing of the hydraulic machine 100, but distinct from the ducts in which the hydraulic working fluid of the hydraulic machine 100 circulates.

A first assembly and a second assembly are defined for the hydraulic machine 100 which are movably mounted in rotation relative to each other about the main axis X-X via the bearings 132. One of the first assembly and of the second assembly is typically fixed and forms a stator of the hydraulic machine 100, while the other of the first assembly and of the second assembly is movable and forms a rotor of the hydraulic machine 100.

In the example illustrated, the shaft 102 and the cylinder block 122 form a first assembly, while the cam 126, the distribution cover 113 and more generally the casing of the hydraulic machine 100 form a second assembly, the first assembly being movable in rotation relative to the second assembly along the main axis X-X.

Advantageously, but optionally, the hydraulic machine 100 according to the invention can comprise one of the following characteristics, taken alone or in any combination: the hydraulic machine 100 is a hydraulic motor; the hydraulic machine 100 is a hydraulic machine with radial pistons; the hydraulic machine 100 comprises a cam provided with several lobes; the hydraulic machine 100 comprises a casing formed of two lateral casing elements framing a central annular casing element, a cam comprising a lobed cam formed on a radially inner surface of the central casing element, a cylinder block mounted in relative rotation in the casing about an axis X-X, facing the cam, a shaft connected in rotation with the cylinder block, pistons guided in radial sliding in respective cylinders of the cylinder block and bearing on the lobes of the cam via of rollers, a planar distributor adapted to ensure a fluid connection with the cylinders of the cylinder block, so that the successive bearing of the pistons on the lobes of the cam causes the relative rotation of the cylinder block and of the elements linked thereto relative to the casing.

The hydraulic machine 100 as proposed here comprises means defining a sweep circuit generally designated by the numerical reference 200, adapted to ensure a sweep of the internal volume of the proximal portion 110, of the middle portion 120 and of the distal portion 130 while having fluid inlet and outlet orifices only in the proximal portion 110.

More specifically, the hydraulic machine 100 comprises an inlet orifice 210 and an outlet orifice 220 between which a sweep circuit 200 is formed. In the example illustrated, the inlet orifice 210 and the orifice outlet 220 are formed in the distribution cover 113.

According to an example, the inlet orifice 210 is connected to an exchange valve 240, adapted to take a fluid flow rate from the hydraulic circuit associated with the hydraulic machine, and to convey this flow rate thus taken towards the inlet orifice 210. Said exchange valve 240 may or may not be integrated into the hydraulic machine 100. It may be added onto the hydraulic machine 100, for example positioned in a flange fixed on the hydraulic machine 100. The figures schematically represent the exchange valve 240 connected to hydraulic ducts ensuring the circulation of hydraulic working fluid of the hydraulic machine 100.

The exchange valve 240 is thus typically configured so as to take fluid from the low-pressure duct connected to the hydraulic machine 100, typically the discharge in the case of a hydraulic motor, or the intake in the case of a hydraulic pump.

As a variant, the sweep can be done in parallel with the exchange circuit.

As a variant, the sweep fluid arriving at the inlet orifice 210 can come from the booster pump 12. As a variant, the sweep fluid may come from a control circuit associated with the hydraulic machine 100. As a variant, the sweep fluid may come from a high-pressure duct connected to the hydraulic machine 100; it can then be brought into the sweep circuit via a pressure reducer. As a variant, the sweep fluid can come from a high-pressure duct internal to the hydraulic machine 100. It is understood that these embodiments are not limiting, and that the sweep fluid can be taken from any suitable fluid source. The fluid is typically oil.

The outlet orifice 220 is typically connected to a tank R typically at ambient pressure of the hydraulic circuit associated with the hydraulic machine 100, typically via a filter and/or a heat exchanger.

The fluid used to carry out the sweep within the internal volume of the hydraulic machine 100 is thus typically the same fluid as the one used for the actuation of the hydraulic machine 100. It is however understood that the fluid carrying out the sweep in the internal volume of the hydraulic machine is at a pressure significantly lower than the pressure of the fluid in the intake and discharge ducts of the hydraulic machine 100; the fluid carrying out the sweep being at the internal pressure within the internal volume of the casing of the hydraulic machine 100, as opposed to the fluid circulating in the hydraulic ducts of the hydraulic machine in connection with the movement of the pistons and qualified as working fluid.

The sweep circuit 200 as presented defines a primary stream F1 and a secondary stream F2 circulating in the internal volume of the hydraulic machine 100.

The distribution of the fluid between the primary stream F1 and the secondary stream F2 is for example carried out by calibration of sections, typically downstream of the inlet orifice 210, or by any other suitable means making it possible to divide a stream of fluid into two streams. It is thus defined, for example, a maximum flow rate that can be conveyed to the secondary stream F2, the remaining flow rate then being conveyed to the primary stream F1, or vice versa. It is also possible to define a maximum flow rate that can be conveyed to the primary stream F1 and a maximum flow rate that can be conveyed to the secondary stream F2.

The example illustrated defines a primary sweep stream F1 and a secondary sweep stream F2 schematized by arrows F1 and F2 respectively. The primary stream F1 and the secondary stream F2 are here schematized as being separated from the inlet orifice 210. It is however understood that this embodiment is not limiting, and that the separation into two streams can be carried out in any point downstream of the inlet orifice 210.

In the example illustrated in FIG. 2, the primary stream F1 takes the following route, from the inlet orifice 210 to the outlet orifice 220:

- the fluid enters the hydraulic machine 100 via the inlet orifice 210 formed in the distribution cover 113.
- the fluid takes a duct formed in the distribution cover 113 up to an interface with the distributor 112.
- the fluid passes through the distributor 112 up to an interface with the cylinder block 122 via a duct formed in the distributor 112. This interface is typically a circular groove formed in the distributor 112 or in the cylinder block 122.
- the fluid passes through the cylinder block 122 via a duct arranged in the cylinder block 122, then opens out into a volume of the distal portion 130, between the shaft 102 and a sleeve 136, and goes up to the distal end of the internal volume. The sleeve 136 is typically mounted bearing against the cylinder block 122, the interface between these elements being provided with a sealing element so that the fluid is guided in the passage between the shaft 102 and the sleeve 130.
- the fluid then passes through the different elements of the distal portion 130 of the hydraulic machine 100, here the braking device 134 and the bearings 132.
- the fluid then joins the internal volume of the middle portion 120, here via a bore formed in the sleeve 136.
- the fluid passes through the middle portion 120, for example by bypassing the cylinder block 122 via a passage radially outward from the main axis X-X, and joins the proximal portion 110, from where it escapes via the outlet orifice 220.

The secondary stream F2 takes the following route:

the fluid enters the hydraulic machine 100 via the inlet orifice 210 formed in the distribution cover 113;

the fluid takes a duct formed in the distribution cover 113, which opens out into an internal volume of the hydraulic machine between the cylinder block 122 and the distribution cover 113;

the fluid escapes via the outlet orifice 220.

The association of the primary stream F1 and of the secondary stream F2 thus makes it possible to ensure fluid sweep in the internal volume of the different portions of the hydraulic machine 100, and thus to ensure cooling and lubrication of the different portions of the hydraulic machine 100 while retaining fluid supply ducts grouped together in the proximal portion 110 of the hydraulic machine 100.

It is however understood that the embodiment represented in FIG. 2 is not limiting.

The following figures show different other embodiments. Only the differences with respect to the embodiment already described with reference to FIG. 2 are described below.

Figure 3:
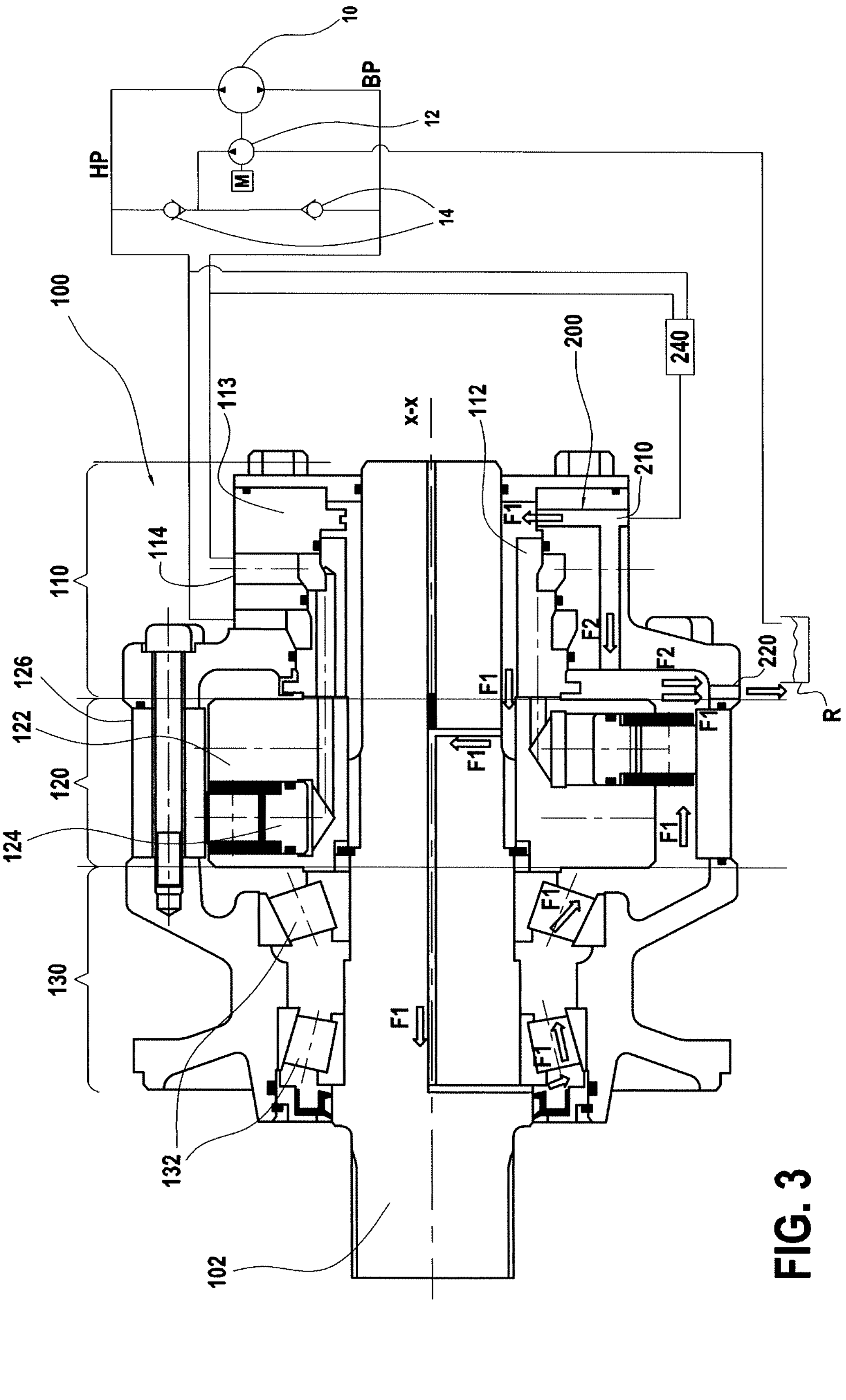
FIG. 3 is a side cross-sectional schematic view of a hydraulic machine in accordance with another aspect of the disclosure.

In the example represented in FIG. 3, the distal portion 130 does not comprise a braking device 134: only the bearings 132 defining the rolling bearing for the hydraulic machine 100.

In this embodiment, the primary stream F1 takes the following route, from the inlet orifice 210 to the outlet orifice 220:

the fluid enters the hydraulic machine 100 via the inlet orifice 210 formed in the distribution cover 113;

the fluid takes a duct formed by a radial clearance between the distributor 112 and the shaft 102;

the fluid takes a duct formed by bores in the shaft 102, and exits at the distal end of the distal portion 130 of the hydraulic machine 100;

the fluid then passes through the different elements of the distal portion 130 of the hydraulic machine 100, here the bearings 132;

the fluid then joins the internal volume of the middle portion 120;

the fluid passes through the middle portion 120, for example by bypassing the cylinder block 122 via a passage radially outward from the main axis X-X, and joins the proximal portion 110, from where it escapes via the outlet orifice 220.

There is therefore in this embodiment a sweep circuit making it possible to ensure fluid sweep in the internal volume of the different portions of the hydraulic machine 100, and thus to ensure cooling and lubrication of the different portions of the hydraulic machine 100 while retaining fluid supply ducts grouped together in the proximal portion 110 of the hydraulic machine 100.

Figure 4:
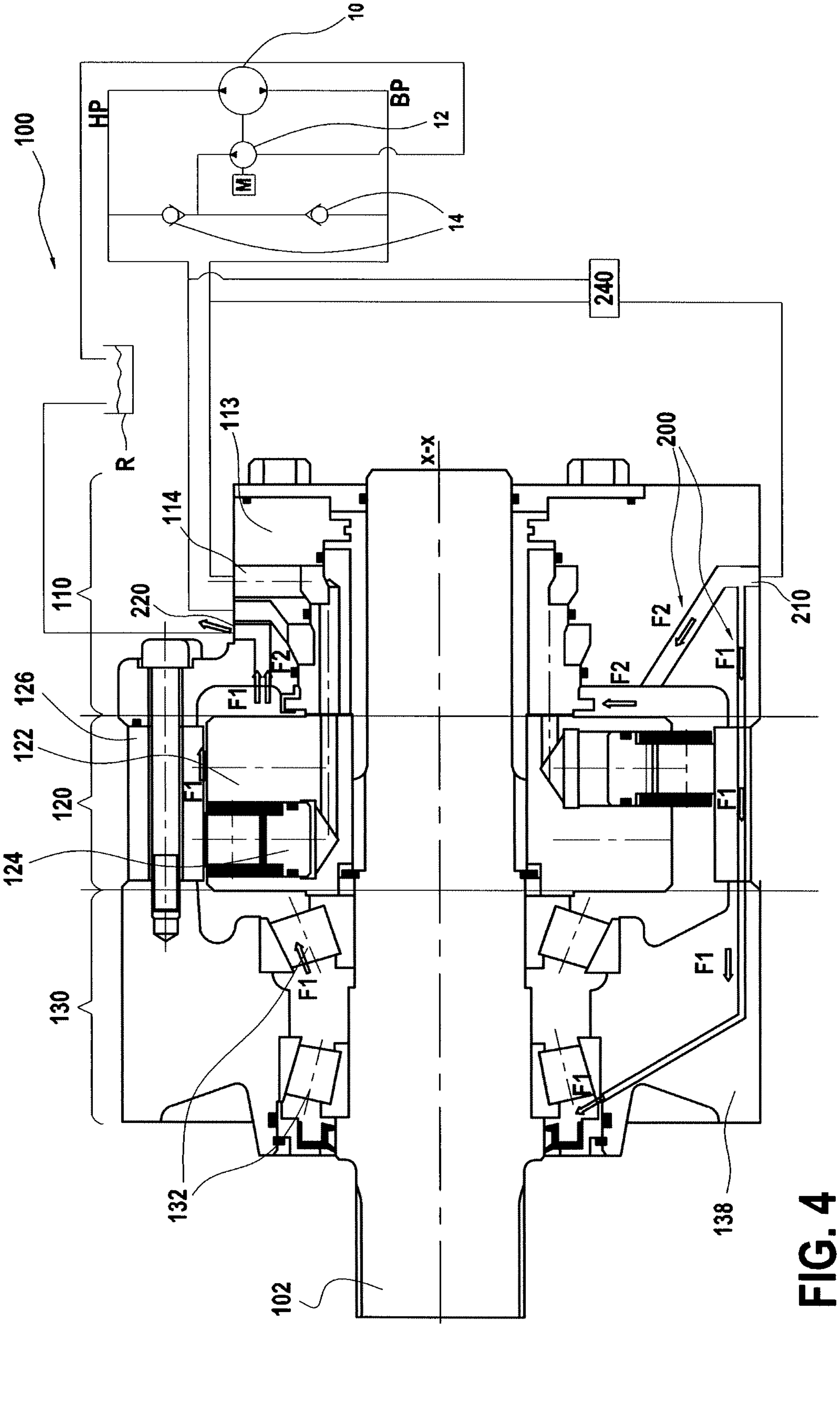
FIG. 4 is a side cross sectional schematic view of a hydraulic machine in accordance with another aspect of the disclosure.

FIG. 4 shows another embodiment.

In this example, the primary stream F1 is conveyed from the inlet orifice 210 to the distal portion 130 via ducts arranged in the distributor cover 113, in the multilobe cam 126 and in a distal cover 138, that is to say generally in the casing of the hydraulic machine 100.

The primary stream F1 is thus re-injected at the distal end of the internal volume of the distal portion 130. The primary stream F1 then passes through the internal volume of the distal portion 130 then the middle portion 120 for example by bypassing the cylinder block 122 via a passage radially outward from the main axis X-X, and joins the proximal portion 110 to reach the outlet orifice 220.

Figure 5:
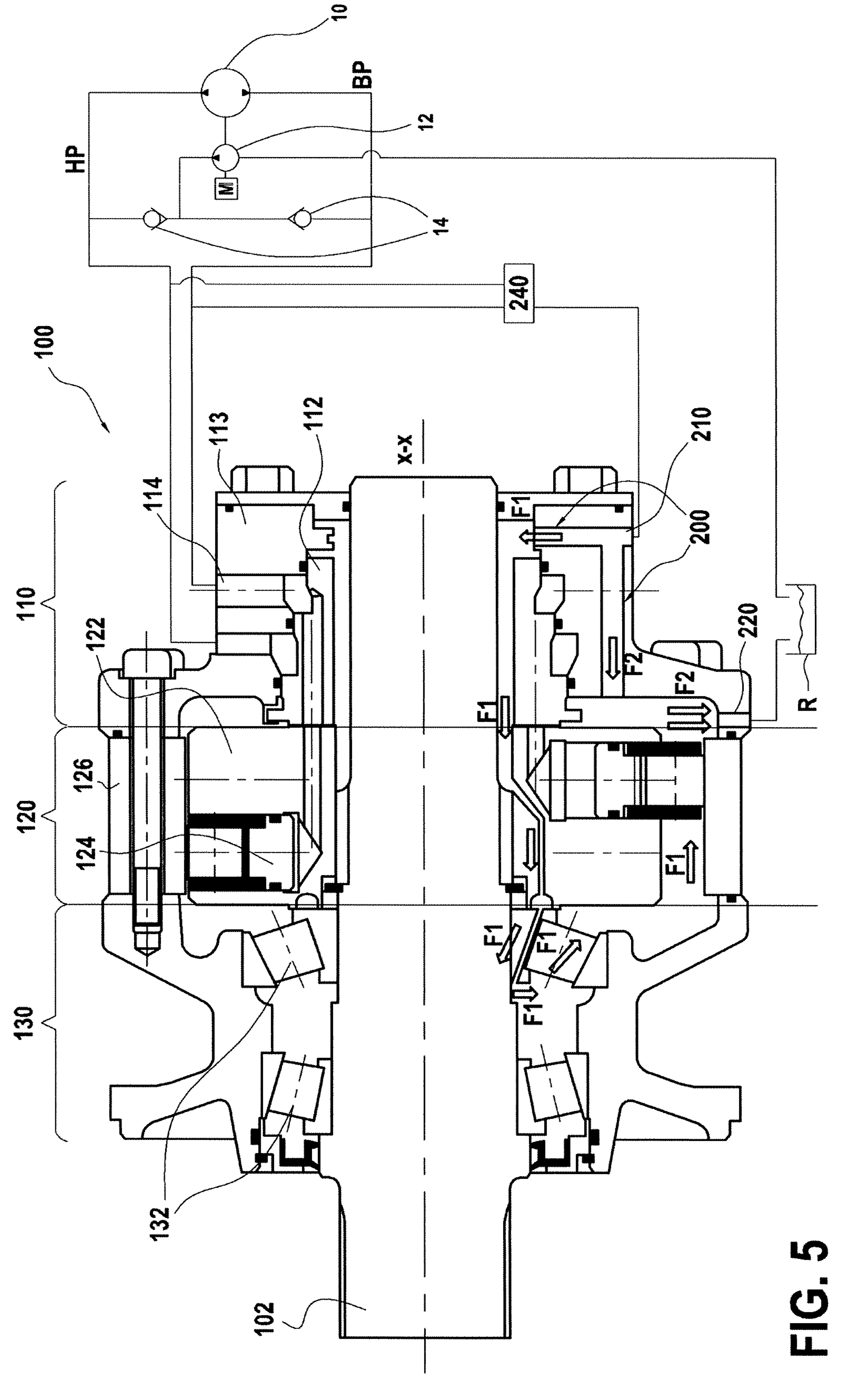
FIG. 5 is a cross sectional schematic view of a hydraulic machine in accordance with another aspect of the disclosure.

FIG. 5 shows another embodiment.

This embodiment is a variant of FIG. 3 described above, in which the duct formed by bores in the shaft 102 has been replaced with bores formed in the cylinder block 122 and in an inner ring of one of the bearings 132.

The primary stream F1 thus opens out into the distal portion 130, between the two bearings 132, then joins the middle portion by passing through one of the bearings 132, passes through the middle portion 120 and joins the proximal portion 110 to reach the outlet orifice 220.

In view of the different embodiments, it is thus understood that in general, the invention proposes to define a primary sweep stream F1 in the internal volume of the hydraulic machine 100, which enters and exits the hydraulic machine by the proximal portion of the hydraulic machine 100, and which ensures a circulation of fluid in the different portions of the hydraulic machine 100, namely a circulation of the sweep fluid successively passing through the proximal portion 110, the middle portion 120 and the distal portion 130, then which passes back through the middle portion 120 and the proximal portion 110 before exiting the hydraulic machine 100.

This primary stream F1 of sweep fluid thus ensures lubrication and cooling of the different portions of the hydraulic machine 100. A secondary stream F2 of sweep fluid typically ensures in parallel a stream of sweep fluid in the proximal portion 110 and the middle portion 120 of the hydraulic machine 100, to ensure lubrication and cooling of the distribution components and the elements associated with the cylinder block 122 of the hydraulic machine 100.

The primary stream F1 and the secondary stream F2 are thus calibrated for example via sections defining a maximum flow rate for either or both of these streams. The primary stream F1 and the secondary stream F2 typically join in the middle portion 120 or in the proximal portion 110 of the hydraulic machine 100 before reaching the outlet orifice 220.

Thus, at least part of the sweep fluid circulates throughout the internal volume of the hydraulic machine 100, and reaches the components positioned in the portions of the hydraulic machine 100 furthest from the inlet orifice 210 and the outlet orifice 220 without requiring that one of these orifices be in a middle or distal portion and/or without requiring an addition of other inlet or outlet orifices of the sweep fluid.

The invention as proposed thus makes it possible to propose a hydraulic machine 100 having fluid intake and discharge ducts only in a proximal portion of the hydraulic machine 100, which thus makes it possible to keep a minimized space requirement and a simplified integration for the hydraulic machine 100 with respect to a hydraulic machine structure in which additional hydraulic ducts are added in order to define additional sweep streams within the hydraulic machine 100.

Ensuring a fluid sweep makes it possible to avoid a temperature rise and/or premature wear in the different portions of the hydraulic machine 100.

The assembly according to the invention can be applied to a hydraulic machine 100 associated with a closed-loop hydraulic circuit or an open-loop hydraulic circuit.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Consequently, the description and drawings should be considered in an illustrative rather than a restrictive sense.

It is also obvious that all the characteristics described with reference to one method can be transposed, alone or in combination, to one device, and conversely, all the characteristics described with reference to one device can be transposed, alone or in combination, to one method.

The invention claimed is:

1. An assembly comprising:

a hydraulic machine comprising a first assembly and a second assembly that are movable in rotation relative to each other along a main axis, the first assembly comprising a shaft and the second assembly comprising a casing, said hydraulic machine having three portions extending successively from a proximal end to a distal end along the main axis, a proximal portion, comprising a distributor and fluid supply and discharge ducts, a middle portion, comprising a cylinder block and a cam, a distal portion, comprising bearings, said hydraulic machine having an internal volume and comprising a circuit for sweeping the internal volume, said sweep circuit having a fluid inlet orifice in the proximal portion, a fluid outlet orifice in the proximal portion, said sweep circuit being configured so as to form a primary sweep stream circulating from the inlet orifice successively in the proximal portion, in the middle portion and in the distal portion of the hydraulic machine, then in the middle portion and in the proximal portion up to the outlet orifice (220).

2. The assembly according to claim 1, wherein the sweep circuit defines two streams in the internal volume of the hydraulic machine:

the primary stream, and a secondary stream, the primary stream and the secondary stream being injected into the hydraulic machine through the fluid inlet orifice, and exiting the hydraulic machine through the fluid outlet orifice.

3. The assembly according to claim 2, wherein the secondary stream defines a circulation of fluid within the proximal portion, between the fluid inlet orifice and the fluid outlet orifice.

4. The assembly according claim 2, wherein the primary stream and the secondary stream are calibrated by means of restrictions defining the maximum fluid flow rate for each of said streams.

5. The assembly according to claim 1, wherein the distal portion of the hydraulic machine comprises a braking device.

6. The assembly according to claim 1, comprising an exchange valve, adapted to take hydraulic fluid from the duct having the lowest pressure among the intake duct and the discharge duct of the hydraulic machine; and to inject it into the fluid inlet orifice of the sweep circuit.

7. The assembly according to claim 6, wherein said exchange valve is integrated into a distribution cover of the hydraulic machine.

8. The assembly according to claim 1, wherein the sweep circuit is supplied from the booster circuit associated with the hydraulic machine or from a control circuit associated with the machine hydraulic.

9. The assembly according to claim 1, wherein the sweep circuit comprises ducts formed in the distributor and/or the shaft and/or the cylinder block of the hydraulic machine, so as to convey the sweep fluid from the inlet orifice to the distal portion of the hydraulic machine, and to inject the sweep fluid into an internal volume of the distal portion of the hydraulic machine.

10. The assembly according to claim 9, wherein the distal portion comprises a sleeve positioned around the shaft, bearing against the cylinder block, said bearing of the sleeve against the cylinder block being provided with a sealing element, said sleeve being configured so as to define a fluid passage along the shaft, up to a distal end of the internal volume of the distal portion of the hydraulic machine.

* * * * *